(12) United States Patent
Naito

(10) Patent No.: US 10,630,993 B2
(45) Date of Patent: Apr. 21, 2020

(54) IMAGE CODING APPARATUS, IMAGE CODING METHOD, AND STORAGE MEDIUM

(71) Applicant: CANON KABUSHIKI KAISHA, Tokyo (JP)

(72) Inventor: Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/907,989

(22) Filed: Feb. 28, 2018

(65) Prior Publication Data

US 2018/0262761 A1  Sep. 13, 2018

(30) Foreign Application Priority Data

Mar. 8, 2017 (JP) .................. 2017-043799

(51) Int. Cl.
| | |
|---|---|
| *H04N 19/119* | (2014.01) |
| *H04N 19/107* | (2014.01) |
| *H04N 19/139* | (2014.01) |
| *H04N 19/176* | (2014.01) |
| *H04N 19/433* | (2014.01) |
| *H04N 19/436* | (2014.01) |

(52) U.S. Cl.
CPC ......... *H04N 19/139* (2014.11); *H04N 19/119* (2014.11); *H04N 19/176* (2014.11); *H04N 19/433* (2014.11); *H04N 19/436* (2014.11); *H04N 19/107* (2014.11)

(58) Field of Classification Search
CPC ............................ H04N 19/139; H04N 19/119
See application file for complete search history.

(56) References Cited

U.S. PATENT DOCUMENTS

| 8,019,000 B2 * | 9/2011 | Suzuki | H04N 19/105 348/416.1 |
| 8,565,312 B2 * | 10/2013 | Tsuchiya | H04N 19/61 375/240.16 |

(Continued)

OTHER PUBLICATIONS

International Telecommunication Union (ITU-T_H.264); "Advanced video coding for generic audiovisual services;" Telecommunication Standardization Sector of ITU; Mar. 2010; pp. 1-676.

(Continued)

*Primary Examiner* — Irfan Habib
(74) *Attorney, Agent, or Firm* — Canon U.S.A., Inc. I.P. Division

(57) ABSTRACT

An apparatus includes a first holding unit configured to hold, in a reference image, first reference pixels in a search range including a block corresponding to a first block as a coding target in the input image, a first search unit configured to search for a motion vector of a prediction block included in the first block, using the first reference pixels, a second holding unit configured to hold, in the reference image, second reference pixels in a search range including a block corresponding to a second block as a coding target, a second search unit configured to search for a motion vector of a prediction block included in the second block, using the second reference pixels, and a transfer unit configured to read, from among the first reference pixels, a reference pixel to be used by the second search unit for the search.

16 Claims, 11 Drawing Sheets

(56) References Cited

U.S. PATENT DOCUMENTS

2006/0188021 A1* 8/2006 Suzuki ................ H04N 19/105
375/240.16
2018/0338156 A1* 11/2018 Morigami .............. H04N 19/52

OTHER PUBLICATIONS

International Telecommunication Union (ITU-T_H.265); "High efficiency video coding;" Telecommunication Standardization Sector of ITU; Apr. 2013; pp. 1-317.

* cited by examiner

FIG.3

| (0,0) | (1,0) | (2,0) | (3,0) | (4,0) | (5,0) | (6,0) | (7,0) | (8,0) | (9,0) |
|-------|-------|-------|-------|-------|-------|-------|-------|-------|-------|
| (0,1) | (1,1) | (2,1) | (3,1) | (4,1) | (5,1) | (6,1) | (7,1) | (8,1) | (9,1) |
| (0,2) | (1,2) | (2,2) | (3,2) | (4,2) | (5,2) | (6,2) | (7,2) | (8,2) | (9,2) |
| (0,3) | (1,3) | (2,3) | (3,3) | (4,3) | (5,3) | (6,3) | (7,3) | (8,3) | (9,3) |
| (0,4) | (1,4) | (2,4) | (3,4) | (4,4) | (5,4) | (6,4) | (7,4) | (8,4) | (9,4) |
| (0,5) | (1,5) | (2,5) | (3,5) | (4,5) | (5,5) | (6,5) | (7,5) | (8,5) | (9,5) |
| (0,6) | (1,6) | (2,6) | (3,6) | (4,6) | (5,6) | (6,6) | (7,6) | (8,6) | (9,6) |
| (0,7) | (1,7) | (2,7) | (3,7) | (4,7) | (5,7) | (6,7) | (7,7) | (8,7) | (9,7) |

301, 302

(X,Y)  X: COLUMN NUMBER  Y: ROW NUMBER

FIG.4

| TIME | T1 | T2 | T3 | T4 |
|------|----|----|----|----|
| A | (6,1) (6,2) (6,3)<br>(5,1) (5,2) (5,3)<br>(4,1) (4,2) (4,3) | (7,1) (7,2) (7,3)<br>(6,1) (6,2) (6,3)<br>(5,1) (5,2) (5,3) | (8,1) (8,2) (8,3)<br>(7,1) (7,2) (7,3)<br>(6,1) (6,2) (6,3) | (9,1) (9,2) (9,3)<br>(8,1) (8,2) (8,3)<br>(7,1) (7,2) (7,3) |
| B | (3,2) (3,3) | (4,2) (4,3) | (5,2) (5,3) | (6,2) (6,3) |
| C | (2,2) (2,3) (2,4)<br>(1,2) (1,3) (1,4)<br>(0,2) (0,3) (0,4) | (3,2) (3,3) (3,4)<br>(2,2) (2,3) (2,4)<br>(1,2) (1,3) (1,4) | (4,2) (4,3) (4,4)<br>(3,2) (3,3) (3,4)<br>(2,2) (2,3) (2,4) | (5,2) (5,3) (5,4)<br>(4,2) (4,3) (4,4)<br>(3,2) (3,3) (3,4) |

FIG. 10

IMAGE CODING APPARATUS, IMAGE CODING METHOD, AND STORAGE MEDIUM

BACKGROUND OF THE INVENTION

Field of the Invention

The aspect of the embodiments relates to an image coding apparatus for coding an image signal, an image coding method, and a storage medium.

Description of the Related Art

As a coding method for use in compressed recording of a moving image, H.264/Moving Picture Experts Group (MPEG)-4 Advanced Video Coding (AVC) (hereinafter, "H.264") is known (ITU-T H.264 (April/2010) Advanced video coding for generic audiovisual services).

In recent years, an activity for internationally standardizing a more efficient coding method as a successor to H.264 starts, and the Joint Collaborative Team on Video Coding (JCT-VC) is established between the International Organization for Standardization (ISO)/the International Electrotechnical Commission (IEC) and the International Telegraph Union Telecommunication Standardization Sector (ITU-T). In the JCT-VC, a High Efficiency Video Coding (HEVC) coding method is standardized (ITU-T H.265 (April/2013) High efficiency video coding).

In HEVC, coding is performed in a raster scanning order in coding unit blocks of predetermined sizes termed coding tree units (CTUs). Each CTU further includes coding units composed of coding blocks termed coding units (CUs). Each CU further includes coding units composed of prediction blocks termed prediction units (PUs).

Further, to standardize HEVC, various coding tools are widely employed in terms of not only an improvement in coding efficiency but also the ease of implementation and the shortening of processing time. In terms of the shortening of processing time, a technique for enhancing parallelism, which assumes an operation on a multi-core central processing unit (CPU) or a plurality of pieces of hardware, is also employed. One of these parallel processing techniques is a technique termed wavefront for processing context-adaptive binary arithmetic coding (hereinafter referred to as "CABAC") in parallel. In wavefront parallel processing, coding is performed by dividing a picture into horizontally long rectangular rows (hereinafter referred to as "CTU lines"), each including a single CTU in a height direction and a plurality of CTUs arranged in a horizontal direction. A picture is thus divided into CTU lines, whereby it is possible to process the CTU lines in parallel in the wavefront parallel processing.

In a case where the wavefront parallel processing is performed, reference pixels for use in a motion vector search process are read in units of bands from a frame memory. However, in a case where inter-frame prediction processes are performed, reference pixels for use in a motion vector search process are read in units of CTUs from the frame memory and then temporarily held in a buffer memory. For example, when inter-frame prediction processes are performed, there is a case where reference pixels referenced in an inter-frame prediction process at a certain time are referenced again in an inter-frame prediction process at another time after that. Thus, these reference pixels are held in units of CTUs in the buffer memory. Further, in the wavefront parallel processing, since CTU lines are processed in parallel as described above, the buffer memory may require a large-capacity memory. However, a large-capacity buffer memory is expensive, and therefore, it is desirable to reduce the buffer memory.

SUMMARY OF THE INVENTION

An apparatus for coding an input image includes a first holding unit configured to hold, in a reference image, first reference pixels in a search range including a block corresponding to a first block as a coding target in the input image, a first search unit configured to search for a motion vector of a prediction block included in the first block, using the first reference pixels, a second holding unit configured to hold, in the reference image, second reference pixels in a search range including a block corresponding to a second block as a coding target in the input image, a second search unit configured to search for a motion vector of a prediction block included in the second block, using the second reference pixels, and a transfer unit configured to read, from among the first reference pixels, a reference pixel to be used by the second search unit for the search, and transfer the reference pixel to the second holding unit.

Further features of the disclosure will become apparent from the following description of exemplary embodiments with reference to the attached drawings.

BRIEF DESCRIPTION OF THE DRAWINGS

FIG. 3 is a diagram illustrating a state where a prediction process is performed by parallel processing in units of CTU lines.

FIG. 4 is a diagram illustrating CTUs of reference pixels held in memories in the present exemplary embodiment.

FIG. 10 is a diagram illustrating CTUs of reference pixels held in memories in the conventional art.

DESCRIPTION OF THE EMBODIMENTS

Exemplary embodiments of the disclosure will be described in detail below based on the attached drawings.

Figure 1:
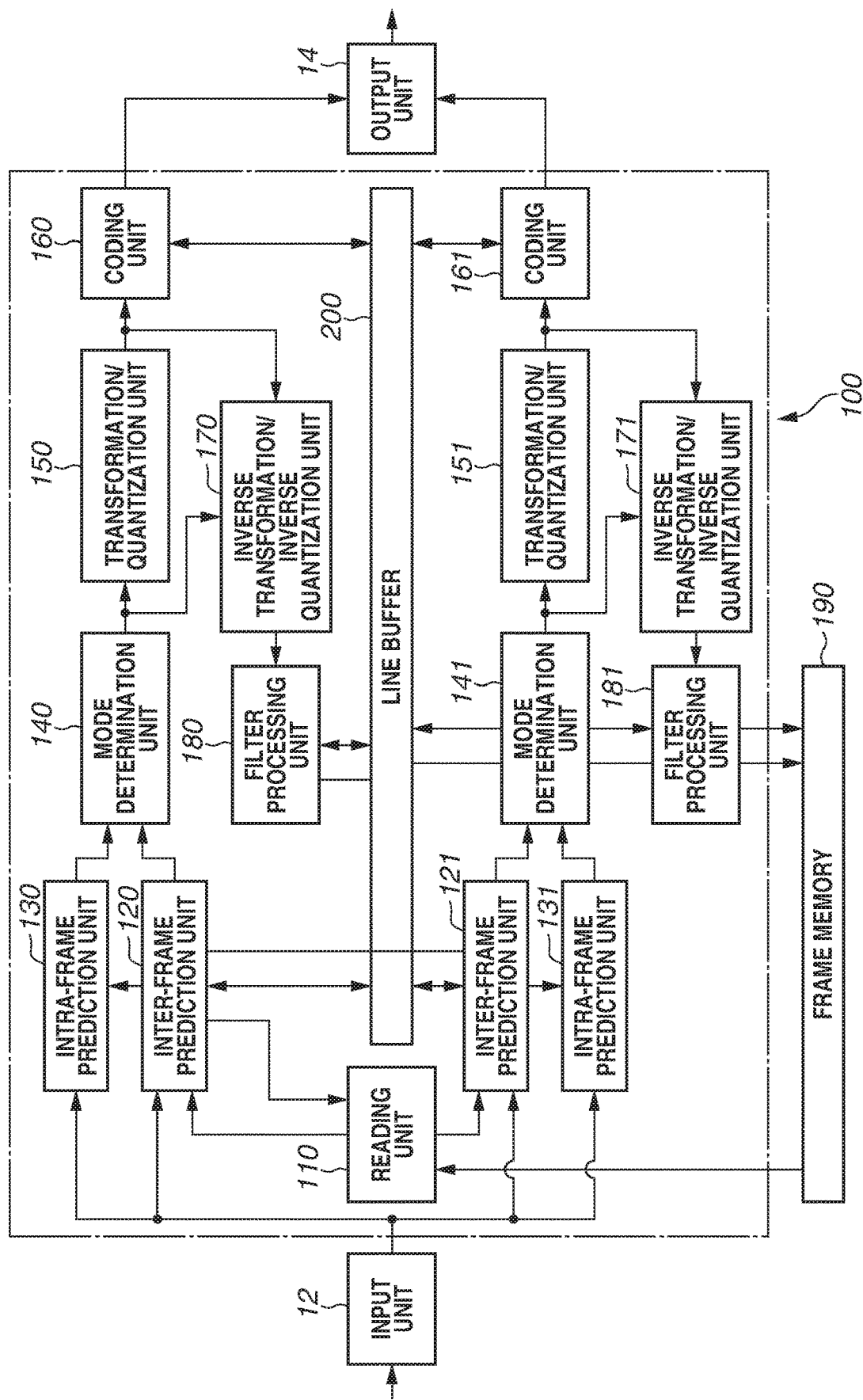
FIG. 1 is a diagram illustrating an example of a general configuration of an image coding apparatus according to the present exemplary embodiment.

FIG. 1 is a diagram illustrating an example of the general configuration of an image coding apparatus 100 according to the present exemplary embodiment. In the present exemplary embodiment, an example is taken where the image coding apparatus 100 codes an input image (an input picture) using a High Efficiency Video Coding (HEVC) coding method. The coding method, however, is not limited to this example, and can be an H.264 coding method. The present exemplary embodiment is described taking an example where a coding tree unit (CTU) defined by the HEVC coding method is a coding unit block, and a coding process is performed on two coding unit block rows (two CTU lines) in parallel by wavefront parallel processing.

Before a configuration of the image coding apparatus 100 according to the present exemplary embodiment illustrated in FIG. 1 is described, an overview of the wavefront parallel processing in the HEVC coding method is described.

Figure 5:
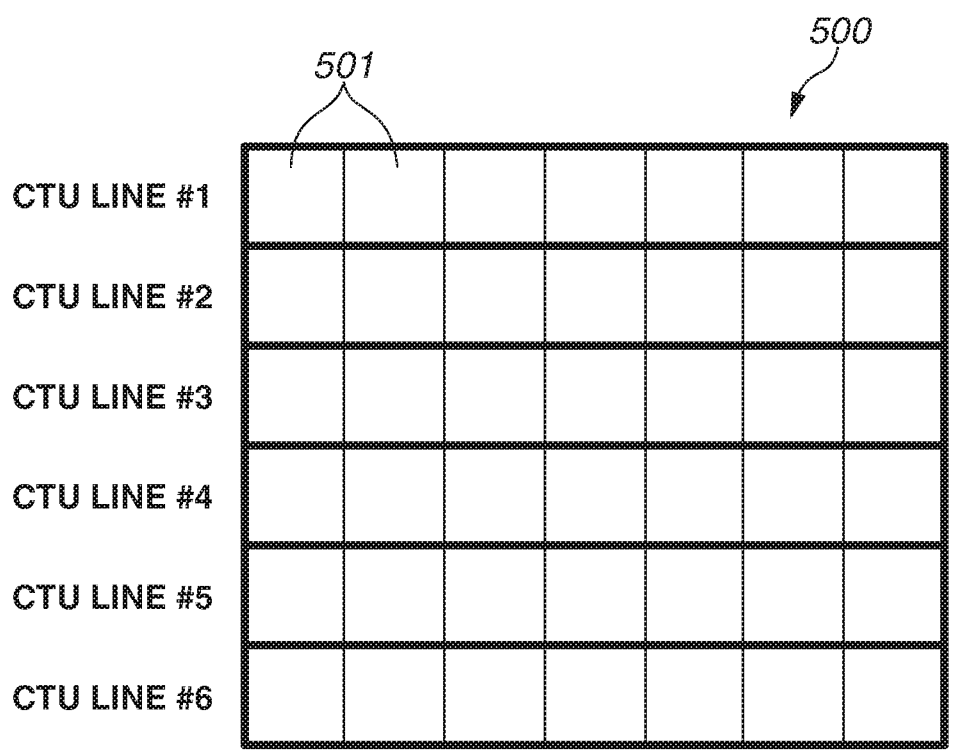
FIG. 5 is a diagram illustrating CTU lines subjected to parallel processing.

In the wavefront parallel processing, as illustrated in FIG. 5, coding is performed by dividing a picture into CTU lines, which are horizontally long rectangular rows, each including a single CTU in a height direction and a plurality of CTUs arranged in a horizontal direction. FIG. 5 illustrates an example where each square represents a single CTU 501, and a picture 500 is divided into CTU lines #1 to #6, each including a plurality of CTUs 501 arranged in a horizontal direction.

Figure 6:
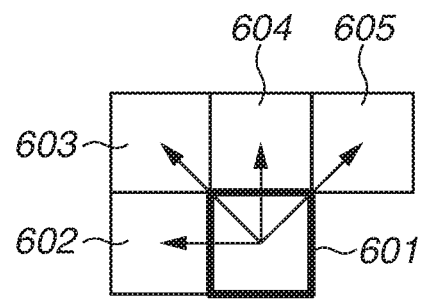
FIG. 6 is a diagram illustrating a current CTU and adjacent CTUs to be referenced.
Figure 7:
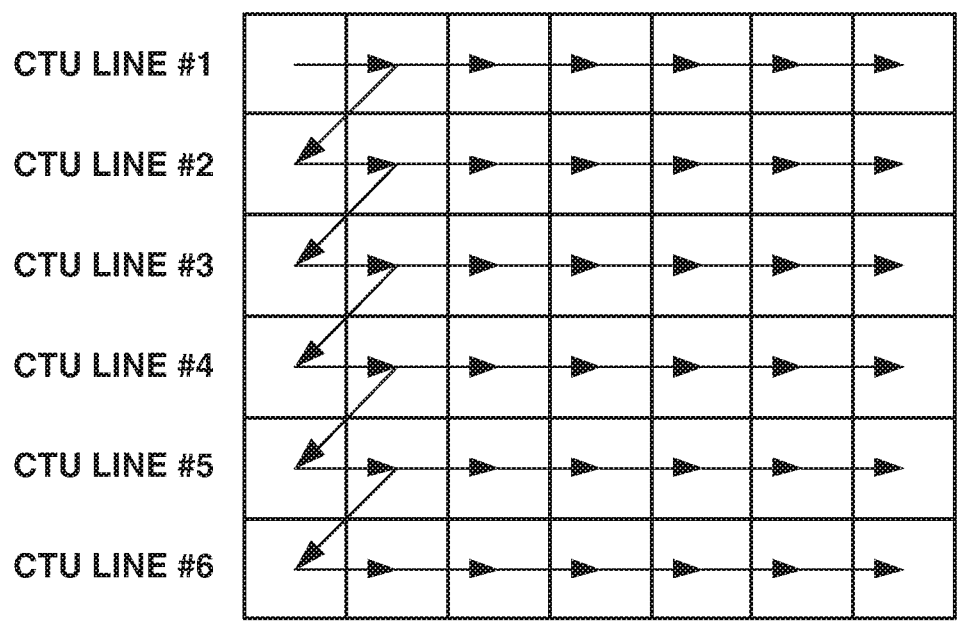
FIG. 7 is a diagram illustrating a state where CABAC contexts are synchronized in parallel processing.
Figure 8A:
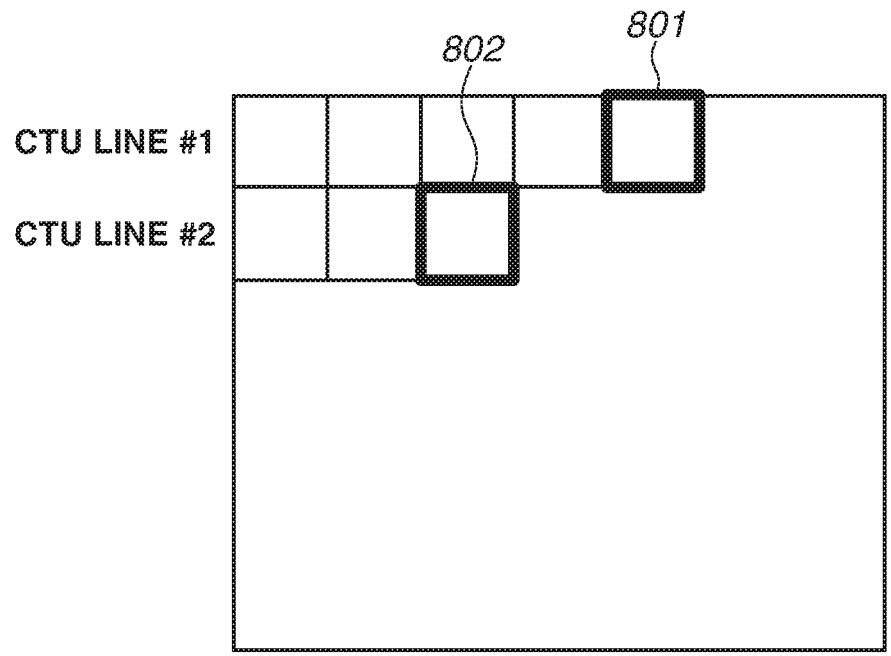
FIGS. 8A and 8B are diagrams illustrating examples where a picture is coded by processing two CTU lines in parallel.

In the wavefront parallel processing, when a prediction coding process is performed on a pixel value or a motion vector, a pixel value or the value of a motion vector that has already been processed is referenced in coding units (CUs) included in CTUs adjacent to a CTU that is currently being processed (hereinafter, a "current CTU"). Hereinafter, this processed pixel to be referenced will be referred to as a "reference pixel". FIG. 6 is a diagram illustrating an example where a current CTU 601 and CTUs 602 to 605 adjacent to the current CTU 601 and to be referenced are extracted from a picture. In the wavefront parallel processing, as illustrated in FIG. 7, a context at the completion of the processing of a second CTU from the left end of a CTU line is used to process a first (left end) CTU on the next CTU line below. In the wavefront parallel processing, a context after the processing of a CTU line is thus used on the next CTU line below, thereby preventing a decrease in coding efficiency due to the resetting of a context-adaptive binary arithmetic coding (CABAC) process and the initialization of a context in each CTU. Further, for this reason, in the wavefront parallel processing, as illustrated in a CTU 801 on a CTU line #1 and a CTU 802 on a CTU line #2 in FIG. 8A, processing is performed at an interval corresponding to, for example, two CTUs or more between the CTU lines #1 and #2. The CTU interval between CTU lines does not need to correspond to two CTUs, and can be, for example, a four-CTU interval as illustrated in a CTU 811 on a CTU line #1 and a CTU 812 on a CTU line #2 in FIG. 8B so long as the interval corresponds to two CTUs or more.

Figure 8B:
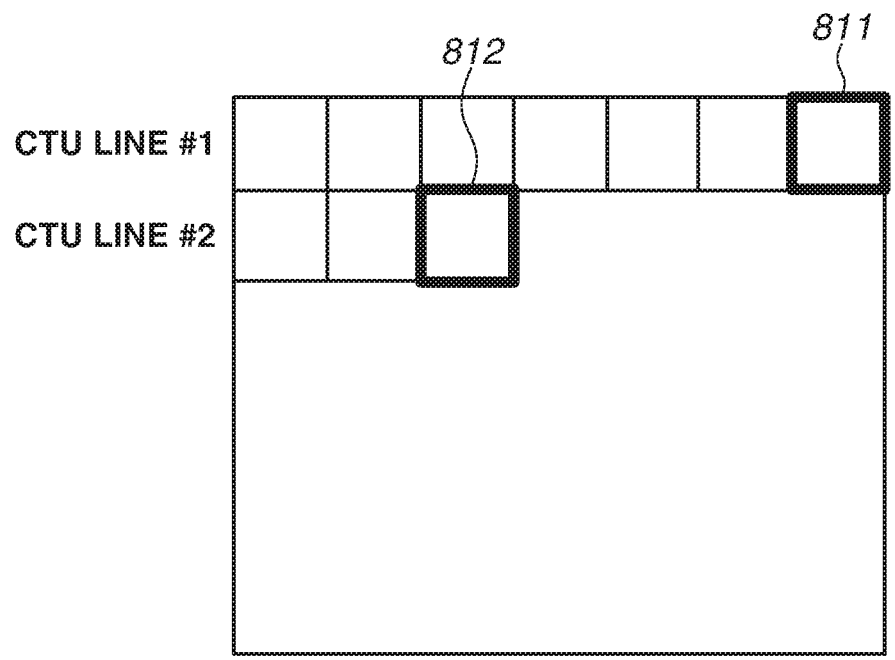

The present exemplary embodiment is described taking an example where in the image coding apparatus 100, as illustrated in FIG. 8B, a coding process is performed on two CTU lines in parallel at a four-CTU interval between the CTU lines. In the present exemplary embodiment, an example is taken where parallel processing is performed at a four-CTU interval. Alternatively, parallel processing can be performed at a three-CTU interval, or parallel processing can be performed at an interval corresponding to four CTUs or more.

With reference to FIG. 1, the configuration of the image coding apparatus 100 according to the present exemplary embodiment is described below.

To an input unit 12, image data of any of an image captured by an image capturing unit (not illustrated), an image read from a recording medium (not illustrated), and an image acquired from a communication network (not illustrated) is input. The image data to be input to the input unit 12 is, for example, image data of each frame included in a moving image. The input image data of the frame is sent as an input picture to inter-frame prediction units 120 and 121 and intra-frame prediction units 130 and 131. The image coding apparatus 100 according to the present exemplary embodiment codes two CTU lines, using a two-channel configuration composed of a first channel including the inter-frame prediction unit 120, the intra-frame prediction unit 130, and subsequent components, and a second channel including the inter-frame prediction unit 121, the intra-frame prediction unit 131, and subsequent components. Consequently, a coding process for coding two CTU lines in parallel is performed.

A frame memory 190 holds image data of a picture subjected to a filter process by each of filter processing units 180 and 181 as described below, as a reference picture for an inter-frame prediction process on a subsequent input picture.

Figure 2:
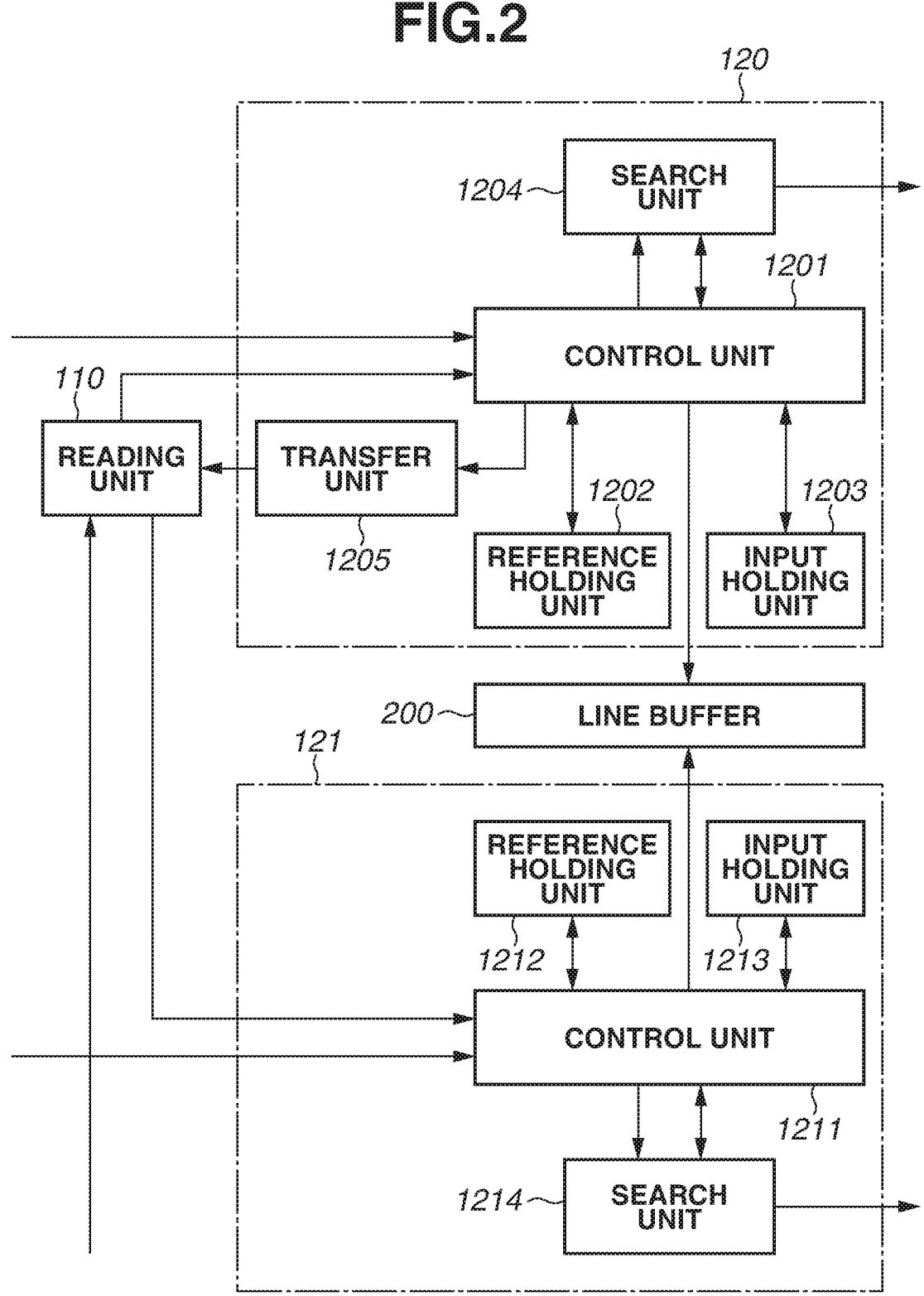
FIG. 2 is a diagram illustrating examples of general configurations of inter-frame prediction units.

A reading unit 110 reads, from a reference picture held in the frame memory 190, data of reference pixels to be used to search for a motion vector in the inter-frame prediction process and outputs the data of the reference pixels to the inter-frame prediction units 120 and 121. The details of the reference pixels read from the frame memory 190 by the reading unit 110 will be described below. Further, although the details will be described below, the reading unit 110 also has a function of outputting, to the inter-frame prediction unit 121, data of the reference pixels output from a transfer unit 1205 of the inter-frame prediction unit 120, as illustrated in FIG. 2. Furthermore, although not illustrated in the figures, the reading unit 110 includes a buffer memory functioning as a first-in-first-out (FIFO) buffer for temporarily holding data of the reference pixels for use in the inter-frame prediction process. The details of the operation and the buffer memory function of the reading unit 110 will also be described below.

Each of the inter-frame prediction units 120 and 121 performs the inter-frame prediction process on the input picture. Specifically, using the reference pixels supplied from the reading unit 110 as described below, each of the inter-frame prediction units 120 and 121 searches for a motion vector corresponding to a prediction unit (PU) (a prediction block) included in each CTU of the input picture, in units of PUs (in units of prediction blocks).

FIG. 3 is a diagram illustrating CTUs when the wavefront parallel processing is performed in units of CTU lines. In a case where an input picture and a reference picture are represented as in FIG. 3, each square represents a CTU. "X" in (X, Y) described in each CTU represents a column number, and "Y" in (X, Y) represents a row number. In the picture illustrated in FIG. 3, data of CTU lines on which the row numbers Y in the CTUs are even numbers is input to the inter-frame prediction unit 120. Data of CTU lines on which the row numbers Y are odd numbers is input to the inter-frame prediction unit 121. Further, in the case of the reference picture, a CTU 301 in FIG. 3 is a CTU in the reference picture and at the same spatial position as a CTU as a coding target in the input picture. When a motion vector is searched for, a range including the CTU 301 and CTUs around the CTU 301 in the reference picture and indicated by a dotted line in FIG. 3 is a search window 302 for the motion vector. In the present exemplary embodiment, the inter-frame prediction unit 120 outputs data of, among the reference pixels not necessary for the inter-frame prediction unit 120 to search for a motion vector in a CTU to be processed next, the reference pixels for the inter-frame prediction unit 121 to search for a motion vector to the reading unit 110 in units of CTUs. The details of such a configuration and an operation of the inter-frame prediction unit 120 will be described below. Then, data output from the inter-frame prediction unit 120 is sent to a mode determination unit 140. Similarly, data output from the inter-frame prediction unit 121 is sent to a mode determination unit 141.

Each of the intra-frame prediction units 130 and 131 performs a search process in an intra-frame prediction (intra prediction process) mode on the input picture in units of PUs. Also in the case of an intra-frame prediction process, similarly to the above, in the input picture illustrated in FIG. 3, data of CTU lines on which the column numbers X in the CTUs are even numbers is input to the intra-frame prediction unit 130. Data of CTU lines on which the column numbers X are odd numbers is input to the intra-frame prediction unit 131. The details of the intra prediction process are discussed in "ITU-T H.264 (April/2010) Advanced video coding for generic audiovisual services", which has been described above, and therefore are not described here. Then, data output from the intra-frame prediction unit 130 is sent to the mode determination unit 140. Similarly, data output from the intra-frame prediction unit 131 is sent to the mode determination unit 141.

Each of the mode determination units 140 and 141 selects either of prediction modes for the inter-frame prediction process and the intra-frame prediction process in units of PUs. Further, based on the selected prediction mode, the motion vector, and the reference pixels, each of the mode determination units 140 and 141 generates a prediction image and obtains a difference between the prediction image and the input picture, thereby generating a prediction difference image. Then, the mode determination unit 140 outputs data of the generated prediction difference image to a transformation/quantization unit 150, and the mode determination unit 141 outputs data of the generated prediction difference image to a transformation/quantization unit 151. Further, data of the prediction mode and the motion vector generated by the mode determination unit 140 is sent to a coding unit 160. Data of the prediction mode and the motion vector generated by the mode determination unit 141 is sent to a coding unit 161.

Each of the transformation/quantization units 150 and 151 orthogonally transforms the prediction difference image, and quantizes transformation coefficient data obtained by the orthogonal transformation. The quantized transformation coefficient data output from the transformation/quantization unit 150 is sent to the coding unit 160 and an inverse transformation/inverse quantization unit 170. The quantized transformation coefficient data output from the transformation/quantization unit 151 is sent to the coding unit 161 and an inverse transformation/inverse quantization unit 171.

Each of the coding units 160 and 161 performs entropy coding on the quantized transformation coefficient data using arithmetic coding. Further, the coding unit 160 performs entropy coding on the data of the prediction mode and the motion vector output from the mode determination unit 140. The coding unit 161 performs entropy coding on the data of the prediction mode and the motion vector output from the mode determination unit 141.

The inverse transformation/inverse quantization unit 170 inversely quantizes the quantized transformation coefficient data output from the transformation/quantization unit 150, and further performs an inverse orthogonal transformation process on the inversely quantized transformation coefficient data, thereby generating (restoring) the prediction difference image. Similarly, the inverse transformation/inverse quantization unit 171 inversely quantizes the quantized transformation coefficient data output from the transformation/quantization unit 151, and further performs the inverse orthogonal transformation process on the inversely quantized transformation coefficient data, thereby generating (restoring) the prediction difference image.

The prediction difference image generated by the inverse transformation/inverse quantization unit 170 performing the inverse orthogonal transformation process is added to the prediction image output from the mode determination unit 140, and the resulting image is output to a filter processing unit 180. Similarly, the prediction difference image generated by the inverse transformation/inverse quantization unit 171 performing the inverse orthogonal transformation process is added to the prediction image output from the mode determination unit 141, and the resulting image is output to a filter processing unit 181.

The filter processing unit 180 performs, on the image output from the inverse transformation/inverse quantization unit 170, a filter process for removing distortion caused by the processes such as the quantization. Similarly, the filter processing unit 181 performs, on the image output from the inverse transformation/inverse quantization unit 171, the filter process for removing distortion caused by the processes such as the quantization. Image data subjected to the filter process by each of the filter processing units 180 and 181 is output to the frame memory 190. Consequently, the image data subjected to the filter process as described above is held in the frame memory 190 as a reference picture for the inter-frame prediction process on an input picture.

The inter-frame prediction unit 120 and the intra-frame prediction unit 130 process a CTU line different from that to be processed by the inter-frame prediction unit 121 and the intra-frame prediction unit 131. Thus, the inter-frame prediction unit 120 and the intra-frame prediction unit 130, and the inter-frame prediction unit 121 and the intra-frame prediction unit 131 are to reference the prediction modes, the motion vectors, and the pixels subjected to the filter processes to each other. The line buffer 200 functions as a buffer for receiving and transferring data for the intra-frame predictions, the coding of the motion vectors, and the filter processes.

As described above, the data of the reference picture is held in the frame memory 190, and the reference pixels for use in a motion vector search process in the inter-frame prediction process are read from the frame memory 190. Further, the data of the reference pixels in the inter-frame prediction processes is sent to the inter-frame prediction unit 120 and the inter-frame prediction unit 121 via the reading unit 110. Thus, a buffer memory for temporarily holding data of the reference pixels is provided in the reading unit 110. In the present exemplary embodiment, the data of the reference pixels to be used by the inter-frame prediction unit 121 is not only read from the frame memory 190, but also transferred from the inter-frame prediction unit 120 via the reading unit 110. The details will be described below.

Before an operation of reading the reference pixels in the present exemplary embodiment is described, an overview of the operation of reading the reference pixels in a conventional image coding apparatus is described below for comparison with the present exemplary embodiment. The conventional image coding apparatus is configured to, in a case where wavefront parallel processing is performed in an inter-frame prediction process, read data of the reference pixels from a frame memory and temporarily hold the data of the reference pixels in a buffer memory.

Figure 9:
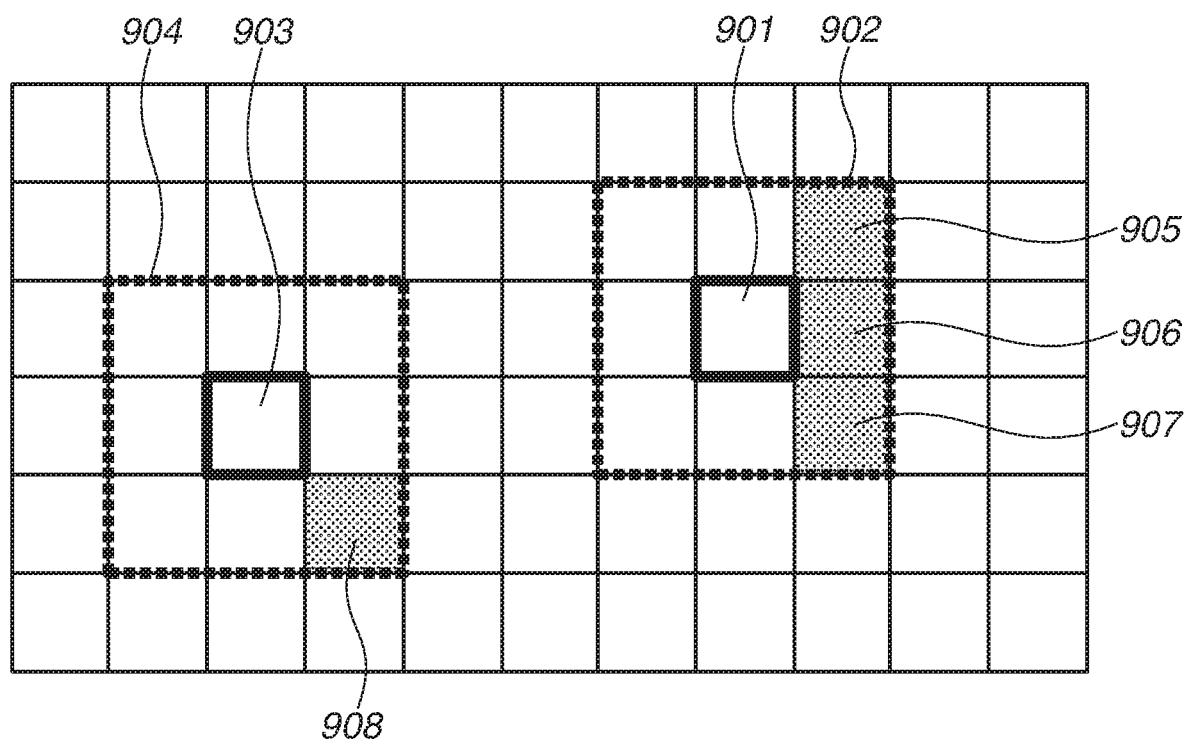
FIG. 9 is a diagram illustrating motion vector search ranges in an inter-frame prediction.

In a case where wavefront parallel processing is performed, the image coding apparatus using the conventional art reads reference pixels for use in a motion vector search process from the frame memory in units of bands. FIG. 9 is a diagram illustrating an example where, in a case where inter-frame prediction processes are performed, the reference pixels are read from the frame memory, and parallel processing is performed on, for example, two CTU lines at an interval corresponding to several CTUs between the CTU lines. In the example of FIG. 9, CTUs 901 and 903 represent CTUs in a reference picture and at the same spatial positions as CTUs as coding targets in an input picture when the motion vector search process is performed on the two CTU lines in parallel. A search window 902 is a motion vector search range corresponding to the CTU 901, and a search window 904 is a motion vector search range corresponding to the CTU 903. CTUs 905, 906, and 907 in the search window 902 and a CTU 908 in the search window 904 are CTUs of the reference pixels to be read from the frame memory. In this example, the reference pixels of the CTUs 906 and 907 are referenced in the search window 902 and then will also be referenced again when the search window 904 moves to the right.

Figure 10:
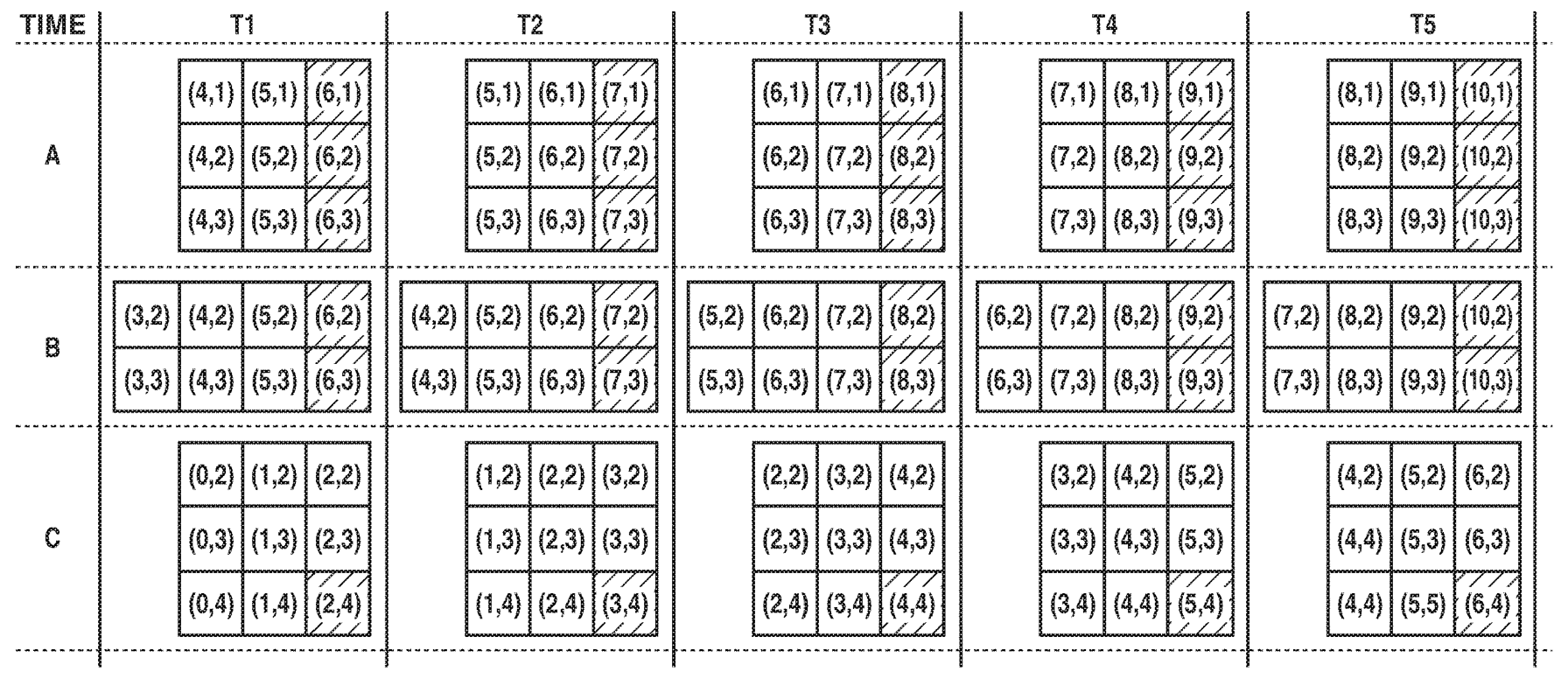

FIG. 10 is a diagram illustrating an example where, in the conventional image coding apparatus, the data of the reference pixels of CTUs is read on two CTU lines in parallel from a reference picture in which a column number X and a row number Y are assigned to each CTU similarly to FIG. 3, and is held in memories as in FIG. 9. In FIG. 10, each square represents a CTU, and shaded CTUs represent CTUs of the reference pixels read from the frame memory at each of times T1 to T5. Also in FIG. 10, similarly to the example of FIG. 3, each CTU is represented by a column number X and a row number Y and represented as a "CTU (X, Y)". In FIG. 10, a section A represents CTUs held in a memory in, between two inter-frame prediction processes in a case where two CTU lines are processed in parallel, the inter-frame prediction process at the times T1 to T5 on the upper CTU line in FIG. 3. Hereinafter, the inter-frame prediction process in the section A will be referred to as an "inter-frame prediction process 1". An inter-frame prediction processing unit (corresponding to the inter-frame prediction unit 120 in FIG. 1) for performing the inter-frame prediction process 1 includes a memory for holding data of nine CTUs corresponding to a search window at each of the times T1 to T5. Meanwhile, in FIG. 10, a section C represents CTUs held in a memory in the inter-frame prediction process at the times T1 to T5 on the lower CTU line in FIG. 3. Hereinafter, the inter-frame prediction process in the section C will be referred to as an "inter-frame prediction process 2". An inter-frame prediction processing unit (corresponding to the inter-frame prediction unit 121 in FIG. 1) for performing the inter-frame prediction process 2 includes a memory for holding data of nine CTUs corresponding to a search window at each of the times T1 to T5. In FIG. 10, a section B represents CTUs held in a buffer memory for temporarily holding the reference pixels read from the frame memory, when the inter-frame prediction processes are performed at the times T1 to T5.

As illustrated in FIG. 10, for example, at the time T1, the reference pixels of CTUs such as shaded CTUs (6, 1), (6, 2), (6, 3), and (2, 4) are read from the frame memory. At the next time T2, data of the CTUs read from the frame memory at the time T1 is shifted in a left direction in FIG. 10, and data of CTUs (7, 1), (7, 2), (7, 3), and (3, 4) is newly read from the frame memory. Meanwhile, data of CTUs (3, 2) and (3, 3) held in the buffer memory (the section B) at the time T1 is input to the inter-frame prediction process 2 (the section C) at the time T2. In the conventional image coding apparatus, also at the time T3 and thereafter, data is similarly read from the frame memory.

For example, the reference pixels of the CTUs (6, 2) and (6, 3) are referenced in the inter-frame prediction process 1 at the time T1 and also referenced in the inter-frame prediction process 2 at the time T5. Thus, as illustrated in the section B in FIG. 10, the buffer memory for holding the reference pixels read from the frame memory is to hold the data of the reference pixels of the CTUs (6, 2) and (6, 3) at least until the time T4 before the time T5. Further, at the time T1, data of CTUs (3, 2), (3, 3), (4, 2), (4, 3), (5, 2), and (5, 3) to be referenced in the inter-frame prediction process 2 at the time T2 to T4 is also already held in the buffer memory. That is, in the conventional image coding apparatus, data of at least eight CTUs is held in the buffer memory for temporarily holding the reference pixels. Thus, the buffer memory is to be a large-capacity memory. To avoid an increase in the capacity of the buffer memory, a method for reading the reference pixels from the frame memory every time the inter-frame prediction process is performed may be possible. In this case, however, the number of times of reading from the frame memory and the amount of data transfer increase, and the power consumption increases, which is not desirable.

In response, in the image coding apparatus 100 according to the present exemplary embodiment, a transfer unit 1205 illustrated in FIG. 2 is provided in, between the two inter-frame prediction units 120 and 121 for performing parallel processing on two CTU lines, the inter-frame prediction unit 120 for processing the preceding CTU line. Then, the image coding apparatus 100 according to the present exemplary embodiment enables the transfer unit 1205 to transfer data of a reference image from the inter-frame prediction unit 120 to the inter-frame prediction unit 121, whereby it is possible to reduce the buffer memory for the reading unit 110.

FIG. 2 is a diagram illustrating detailed configurations of the inter-frame prediction units 120 and 121 of the image coding apparatus 100 according to the present exemplary embodiment. FIG. 2 also illustrates the reading unit 110 and the line buffer 200.

As illustrated in FIG. 2, the inter-frame prediction unit 120 includes a control unit 1201, a reference holding unit 1202, an input holding unit 1203, a search unit 1204, and a transfer unit 1205. The inter-frame prediction unit 121 includes a control unit 1211, a reference holding unit 1212, an input holding unit 1213, and a search unit 1214.

In the inter-frame prediction unit 120, the control unit 1201 is a memory control unit for controlling writing and reading to and from the reference holding unit 1202 and the input holding unit 1203, and writing and reading to and from the line buffer 200. The control unit 1201 writes pixel data of a current coding target in an input picture to the input holding unit 1203 and writes, to the reference holding unit 1202, data of the reference pixels read from the frame memory 190 by the reading unit 110. The input holding unit 1203 is a memory for holding pixels as a current coding target in an input picture in units of CTUs. The reference holding unit 1202 is a memory for holding, in units of CTUs, the reference pixels to be used by the search unit 1204 to search for a motion vector. In the reference holding unit 1202, pieces of pixel data corresponding to a search window (the search window 302 in FIG. 3) including pixels of a CTU (the CTU 301 in FIG. 3) in a reference picture and at the same spatial position as a CTU as a coding target and pixels of CTUs around the CTU are held. The aspect of the embodiments is not limited to this. For example, in a case where an image obtained by performing pan and tilt operations on a camera is coded as an input picture, a search window can be shifted according to the directions of the pan and the tilt. The control unit 1201 reads from the reference holding unit 1202 a reference pixel at a position requested by the search unit 1204, and outputs the reference pixel to the search unit 1204.

The search unit 1204 reads pixels of a prediction block in a CTU as a coding target from the input holding unit 1203 via the control unit 1201, reads pixels of a search window from the reference holding unit 1202, and searches for a motion vector by a block matching process. Specifically, the search unit 1204 calculates the coding cost of all the pixels in the search window by comparing these pixels with the pixels of the CTU as the coding target by block matching, and detects as a motion vector the position where the coding cost is minimized. The aspect of the embodiments is not limited to this example. For example, the search unit 1204 can search for a motion vector by thinning the pixels in the search window, or search for a motion vector by generating reduced images of the search window and the input CTU as the coding target.

The control unit 1211 of the inter-frame prediction unit 121 is a memory control unit similar to the control unit 1201, and controls writing and reading to and from the reference holding unit 1212, the input holding unit 1213, and the line buffer 200. The control unit 1211 writes pixel data of a current coding target in an input picture to the input holding unit 1213, and writes, to the reference holding unit 1212, data of the reference pixels read from the frame memory 190 by the reading unit 110. The input holding unit 1213 is a memory similar to the input holding unit 1203, and holds pixels as a current coding target in an input picture in units of CTUs. The reference holding unit 1212 is a memory similar to the reference holding unit 1202, and holds, in units of CTUs, the reference pixels to be used by the search unit 1214 to search for a motion vector. As described in FIG. 3, however, a CTU as a processing target of the inter-frame prediction unit 121 is a CTU that is four CTUs away on the next CTU line below a CTU line to be processed by the inter-frame prediction unit 120. Also in the inter-frame prediction unit 121, for example, in a case where an image obtained by performing pan and tilt operations on a camera is coded as an input picture, a search window can be shifted according to the directions of the pan and the tilt. The control unit 1211 reads from the reference holding unit 1212 a reference pixel at a position requested by the search unit 1214, and outputs the reference pixel to the search unit 1214.

The search unit 1214 is a motion vector search unit similar to the search unit 1204. The search unit 1214 reads pixels of a prediction block in a CTU and pixels of a search window from the input holding unit 1213 and the reference holding unit 1212, and searches for a motion vector by the block matching process. Similarly to the inter-frame prediction unit 120, the search unit 1214 can search for a motion vector by thinning the pixels in the search window, or search for a motion vector by generating reduced images of the search window and the input CTU as the coding target.

In the case of the present exemplary embodiment, the inter-frame prediction unit 120 transfers data of, among CTUs not necessary for the inter-frame prediction unit 120 to search for a motion vector in a CTU to be processed at a next time, CTUs for the inter-frame prediction unit 121 to search for a motion vector later, to the inter-frame prediction unit 121. Thus, after the search unit 1204 finishes processing in a CTU, the transfer unit 1205 reads, among the reference pixels not to be used to search for a motion vector of a prediction block in each CTU to the right of the CTU, pixels to be referenced later by the search unit 1214 from the reference holding unit 1202 via the control unit 1201. Then, the transfer unit 1205 transfers data of the read the reference pixels to the inter-frame prediction unit 121 via the reading unit 110. That is, the transfer unit 1205 has a function of transferring data of the reference pixels from the reference holding unit 1202 to the reference holding unit 1212.

With reference to FIG. 4, the specific operation of the transfer unit 1205 is described below.

FIG. 4 is a diagram illustrating an example where, in the image coding apparatus 100 according to the present exemplary embodiment, data of the reference pixels of CTUs is read on two CTU lines in parallel from a reference picture in which a column number X and a row number Y are assigned to each CTU similarly to FIG. 3, and is held in memories as in FIG. 3. In FIG. 4, each square represents a CTU, and shaded CTUs represent CTUs of the reference pixels read from the frame memory 190 at each of times T1 to T4. Also in FIG. 4, similarly to the example of FIG. 3, each CTU is represented by a column number X and a row number Y, and represented as a "CTU (X, Y)". In FIG. 4, a section A represents CTUs held in, between the two inter-frame prediction units 120 and 121 according to the present exemplary embodiment, the reference holding unit 1202 of the inter-frame prediction unit 120 that performs the inter-frame prediction process at the times T1 to T4 on the upper CTU line in FIG. 3. Meanwhile, in FIG. 4, a section C represents CTUs held in the reference holding unit 1212 of the inter-frame prediction unit 121 that performs the inter-frame prediction process at the times T1 to T4 on the lower CTU line in FIG. 3. That is, the reference holding units 1202 and 1212 are memories for holding data of nine CTUs corresponding to a search window at each of the times T1 to T4. In FIG. 4, a section B represents CTUs held in the buffer memory provided in the reading unit 110 that reads a reference image from the frame memory 190, when the inter-frame prediction processes are performed at the times T1 to T4.

In the case of the present exemplary embodiment, as illustrated in FIG. 4, for example, at the time T1, the reference pixels of CTUs such as shaded CTUs (6, 1), (6, 2), (6, 3), and (2, 4) are read from the frame memory 190. At the next time T2, data of the CTUs read from the frame memory 190 at the time T1 is shifted in the left direction in FIG. 4, and data of CTUs (7, 1), (7, 2), (7, 3), and (3, 4) is newly read from the frame memory 190.

In the case of the present exemplary embodiment, at the time T1, the inter-frame prediction unit 120 has finished the motion vector search process in a CTU (5, 2). Further, at the time T1, the inter-frame prediction unit 121 has finished the motion vector search process in a CTU (1, 3), which is four CTUs away from the CTU (5, 2) in FIG. 3 in the left direction on the next CTU line below the CTU (5, 2). At this time, the transfer unit 1205 reads, among CTUs not to be used to search for a motion vector at the next time T2, CTUs of pixels to be referenced later by the search unit 1214 from the reference holding unit 1202 via the control unit 1201. Further, at the time T2, the transfer unit 1205 reads CTUs (4, 2) and (4, 3), which are not used by the search unit 1204 to search for a motion vector and will be referenced by the search unit 1214 to search for a motion vector at the time T3, from the reference holding unit 1202 via the control unit 1201. Then, the transfer unit 1205 transfers data of the read CTUs (4, 2) and (4, 3) to the inter-frame prediction unit 121 via the reading unit 110. Consequently, at the time T2, the data of the CTUs (4, 2) and (4, 3) is held in the buffer memory of the reading unit 110.

At the next time T3, the data of the CTUs (4, 2) and (4, 3) held in the buffer memory of the reading unit 110 is sent to the inter-frame prediction unit 121 and held in the reference holding unit 1212. Further, as illustrated in FIG. 4, at the time T3, data of CTUs (8, 1), (8, 2), (8, 3), and (4, 4) is read from the frame memory 190. Thus, at the time T3, data of CTUs including the CTUs (4, 2) and (4, 3) is held in the reference holding unit 1212 of the inter-frame prediction unit 121 before the search unit 1214 starts the motion vector search process in a CTU (3, 3).

As described above, in the case of the present exemplary embodiment, among the reference pixels to be used by the search unit 1204 for a search, the reference pixels to be transferred from the transfer unit 1205 are not read from the frame memory 190 by the reading unit 110, and the reference pixels not to be transferred from the transfer unit 1205 are read from the frame memory 190 by the reading unit 110. Thus, the reference pixels read from the frame memory 190 and the reference pixels transferred from the transfer unit 1205 are held in the reference holding unit 1212.

As described above, in the present exemplary embodiment, the inter-frame prediction unit 120 transfers data of, among the reference pixels not necessary for the inter-frame prediction unit 120 to search for a motion vector in a CTU to be processed next, the reference pixels for the inter-frame prediction unit 121 to search for a motion vector A later to the inter-frame prediction unit 121. That is, in the case of the present exemplary embodiment, the transfer unit 1205 transfers the reference pixels from the reference holding unit 1202 to the reference holding unit 1212, and the reference holding unit 1202 functions also as a buffer memory. Thus, according to the present exemplary embodiment, the buffer memory for holding the reference pixels is reduced in the reading unit 110.

Further, in the case of the present exemplary embodiment, among the reference pixels to be referenced by the inter-frame prediction unit 121, the reference pixels to be transferred by the transfer unit 1205 are not read from the frame memory 190 by the reading unit 110. Thus, according to the present exemplary embodiment, the number of times of reading from the frame memory 190 and the amount of data transfer are reduced, and the power consumption is also reduced.

Figure 11:
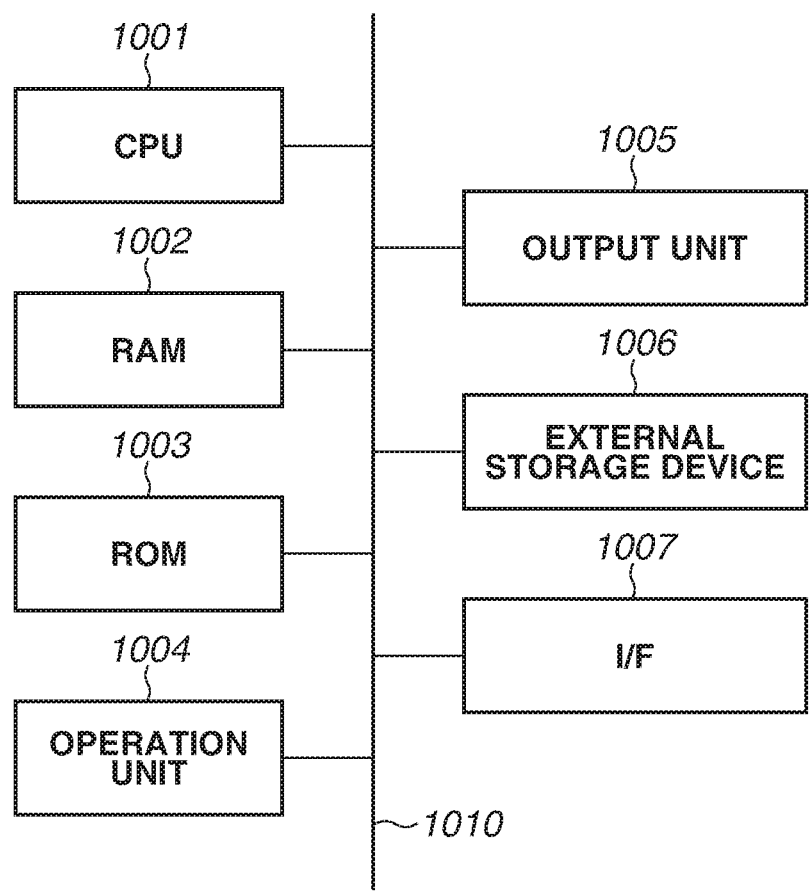
FIG. 11 is a diagram illustrating an example of a configuration of a personal computer (PC) capable of achieving an image coding process according to the present exemplary embodiment.

FIG. 11 is a diagram illustrating an example of a general configuration of a computer for achieving the image coding apparatus 100 according to the present exemplary embodiment.

In FIG. 11, a central processing unit (CPU) 1001 is a central arithmetic unit. A random-access memory (RAM) 1002 is a volatile memory. A program for achieving an image coding process according to the present exemplary embodiment is loaded into the RAM 1002. Further, in the RAM 1002, image data is temporarily stored. A read-only memory (ROM) 1003 is a non-volatile memory. In the ROM 1003, a start-up program for the CPU 1001 and various types of initialization data are stored. An external storage device 1006 is a recording device having a larger capacity than the RAM 1002 and is composed of, for example, a hard disk drive (HDD) or a solid-state drive (SSD). In the external storage device 1006, an operating system (OS) (basic software) to be executed by the CPU 1001, a program for achieving the image coding process according to the present exemplary embodiment, and various other types of data are stored. Further, in the external storage device 1006, captured image data and image data acquired via a network can also be recorded. An interface (I/F) 1007 is an interface for connecting to an external network. Communication via the Internet and communication with another computer are performed via the I/F 1007. The program for the image coding process according to the present exemplary embodiment can be acquired via the I/F 1007. Further, image data to be treated in the image coding process according to the present exemplary embodiment can also be acquired via the I/F 1007. An output unit 1005 is a display device such as a liquid crystal display. These components are connected together by a bus 1010.

When the computer starts, such as when the computer is turned on, the CPU 1001 executes the start-up program stored in the ROM 1003. This start-up program is used to read the OS stored in the external storage device 1006 and load the OS into the RAM 1002. After the OS starts, and if an instruction to start the program for the image coding process according to the present exemplary embodiment is given by a user through an operation unit 1004, the CPU 1001 reads the program for the image coding process from the external storage device 1006 and loads the program into the RAM 1002. Consequently, the CPU 1001 becomes able to execute the image coding process according to the present exemplary embodiment. Further, the CPU 1001 also stores various types of data for use in the operation of the program for the image coding process according to the present exemplary embodiment on the RAM 1002, and performs reading and writing from and to the various types of data.

The image coding process program according to the present exemplary embodiment is a program for enabling the CPU 1001 to execute the processing of components except for the frame memory 190 and a memory of the line buffer 200 in FIG. 1. That is, the CPU 1001 executes the image coding process program, thereby performing the processing of components such as the reading unit 110, the intra-frame prediction units 130 and 131, the inter-frame prediction units 120 and 121, and the mode determination units 140 and 141. Further, the CPU 1001 executes the image coding process program and thereby also can perform the processing of the transformation/quantization units 150 and 151, the inverse transformation/inverse quantization units 170 and 171, the filter processing units 180 and 181, and the coding units 160 and 161. Furthermore, the image coding process program also includes a program for causing the CPU 1001 to form the buffer memory of the reading unit 110, the reference holding units 1202 and 1212, and the input holding units 1203 and 1213 in the RAM 1002. The image coding process program can include a program for causing the CPU 1001 to form the frame memory 190 and the line buffer 200 in the RAM 1002.

The above exemplary embodiments merely illustrate specific examples for carrying out the disclosure, and the technical scope of the disclosure should not be interpreted in a limited manner based on these exemplary embodiments. That is, the aspect of the embodiments can be carried out in various manners without departing from the technical idea or the main feature of the disclosure.

According to the above exemplary embodiments, it is possible to reduce a buffer memory.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computerreadable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-043799, filed Mar. 8, 2017, which is hereby incorporated by reference herein in its entirety.

What is claimed is:

1. An apparatus for coding a first block row and a second block row in parallel, the first block row and the second block row being included in an input image, the apparatus comprising a computer executing instructions that, when executed by the computer, cause the computer to function as:
   a first holding unit configured to hold, for a first block which is a coding target in the first block row, first reference pixels corresponding to a first search range in a reference image which is different from the input image, the first search range including at least a first corresponding block in which position corresponds to the first block;
   a first search unit configured to search for a motion vector for a first prediction block included in the first block, using the first reference pixels;
   a second holding unit configured to hold, for a second block which is a coding target in the second block row, second reference pixels corresponding to a second search range in the reference, the second search range including at least a second corresponding block in which position corresponds to the second block;
   a second search unit configured to search for a motion vector for a second prediction block included in the second block, using the second reference pixels; and
   a transfer unit configured to transfer data of a part of the first reference pixels to the second holding unit, wherein the part of the first reference pixels is used by the second search unit after the part of the first reference pixels is used by the first search unit, and wherein the part of the first reference pixels corresponds to one or more blocks which are on the left side with respect to the first corresponding block.

2. The apparatus according to claim 1, wherein the one or more blocks are a block which is adjacent on the left of the first corresponding block and a block diagonally below and to the left of the first corresponding block.

3. The apparatus according to claim 1, wherein the first block and the second block are away from each other at an interval corresponding to at least two blocks in directions of the rows.

4. The apparatus according to claim 1, wherein the instructions further cause the computer to function as a reading unit configured to read the reference pixels from a frame memory holding the reference image.

5. The apparatus according to claim 4, wherein the transfer unit transfers the reference pixel read from the first holding unit to the second holding unit via the reading unit.

6. The apparatus according to claim 5, wherein, among the reference pixels to be used by the second search unit for the search, the part of the first reference pixels is not read from the frame memory, and a reference pixel not to be transferred from the transfer unit is read from the frame memory, and the reading unit outputs to the second holding unit the reference pixel read from the frame memory and the part of the first reference pixels.

7. A method for an apparatus for coding a first block row and a second block row in parallel, the first block row and the second block row being included in an input image, the method comprising:
   holding by the first holding unit, for a first block which is a coding target in the first block row, first reference pixels corresponding to a first search range in a reference image which is different from the input image, the first search range including at least a first corresponding block in which position corresponds to the first block;
   first searching for a motion vector for a prediction block included in the first block, using the first reference pixels;
   holding by the second holding unit, for a second block which is a coding target in the second block row, second reference pixels corresponding to a second search range in the reference, the second search range including at least a second corresponding block in which position corresponds to the second block;
   second searching for a motion vector for a second prediction block included in the second block, using the second reference pixels; and
   transferring data of a part of the first reference pixels to the second holding unit, wherein the part of the first reference pixels is used by a second search unit after the part of the first reference pixels is used by the first search unit, and wherein the part of the first reference pixels corresponds to one or more blocks which are on the left side with respect to the first corresponding block.

8. The method according to claim 7, wherein the one or more blocks are a block which is adjacent on the left of the first block and a block diagonally below and to the left of the first block.

9. The method according to claim 7, wherein the first block and the second block are away from each other at an interval corresponding to at least two blocks in directions of the rows.

10. The method according to claim 7, further comprising reading the reference pixels from a frame memory holding the reference image.

11. The method according to claim 10, wherein the transferring transfers the reference pixel read from the first holding unit to the second holding unit.

12. A non-transitory storage medium which stores a program for causing a computer to function as:
- a first holding unit configured to hold, for a first block which is a coding target in the first block row, first reference pixels corresponding to a first search range in a reference image which is different from the input image, the first search range including at least a first corresponding block in which position corresponds to the first block;
- a first search unit configured to search for a motion vector for a prediction block included in the first block, using the first reference pixels;
- a second holding unit configured to hold, for a second block which is a coding target in a second block row, second reference pixels corresponding to a second search range in the reference, the second search range including at least a second corresponding block in which position corresponds to the second block, the second block row being included in the input image and being in paralleled with the first block row;
- a second search unit configured to search for a motion vector for a second prediction block included in the second block, using the second reference pixels; and
- a transfer unit configured to transfer data of a part of the first reference pixels to the second holding unit, wherein the part of the first reference pixels is used by the second search unit after the part of the first reference pixels is used by the first search unit, and wherein the part of the first reference pixels corresponds to one or more blocks which are on the left side with respect to the first corresponding block.

13. The non-transitory storage medium according to claim 12, wherein the one or more blocks are a block which is adjacent on the left of the first block and a block diagonally below and to the left of the first block.

14. The non-transitory storage medium according to claim 12, wherein the first block and the second block are away from each other at an interval corresponding to at least two blocks in directions of the rows.

15. The non-transitory storage medium according to claim 12, further comprising a reading unit configured to read the reference pixels from a frame memory holding the reference image.

16. The non-transitory storage medium according to claim 15, wherein the transfer unit transfers the reference pixel read from the first holding unit to the second holding unit via the reading unit.

* * * * *